United States Patent Office 3,712,940
Patented Jan. 23, 1973

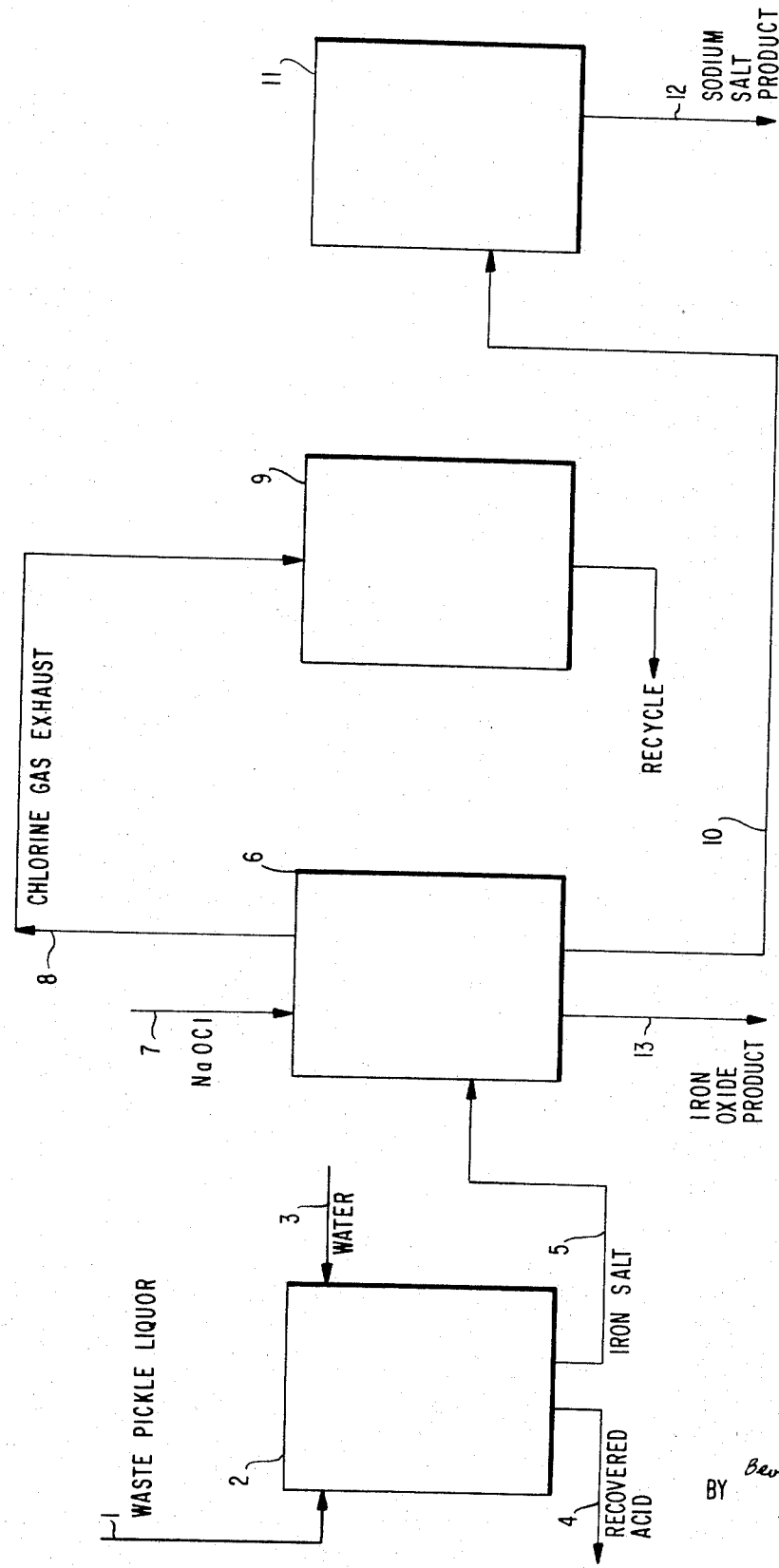

3,712,940
METHOD FOR ELIMINATING DUMPING OF WASTE PICKLE LIQUOR AND CONVERSION THEREOF INTO USEFUL PRODUCTS
Harry Silby, Miami, Fla., Maymie Silby and Joseph H. Krause, executors of the estate of Harry Silby, deceased, assignors to Wire Sales Company
Continuation-in-part of abandoned application Ser. No. 752,802, Aug. 15, 1968. This application Nov. 24, 1970, Ser. No. 92,452
Int. Cl. C01g 49/02; C02b 1/26
U.S. Cl. 423—140                               11 Claims

ABSTRACT OF THE DISCLOSURE

Pollution of rivers, lakes and streams caused by the dumping of waste pickle liquor, can be completely eliminated by a process including the steps of crystallization, to recover and recycle most of the spent acid, contacting the filtrate with NaOCl, separation of precipitate followed by drying to obtain ferric oxide which is a commercially useful product. The filtrate obtained after treatment with NaOCl contains the corresponding sodium salt, depending upon the composition of the waste pickle liquor, which can be recovered as a further useful product.

---

This application is a continuation-in-part application of my copending patent application, Ser. No. 752,802 filed Aug. 15, 1968, now abandoned, the entire disclosure of which is relied on herein and the benefit of which is hereby claimed.

The present invention pertains to the elimination entirely of the common practice of dumping waste pickling solutions in lakes, rivers and other bodies of water which causes serious pollution problems. More particularly, the present invention pertains to a method of treating waste pickle liquor, which may contain sulfuric acid, hydrochloric acid, phosphoric acid, citric acid, and the like, or mixtures thereof, to convert these waste materials into useful chemical products. Furthermore, instead of constituting a serious pollution problem, waste pickle liquors can now be considered as a source of valuable products having many uses.

Pickle liquor is employed in the cleaning or pickling of iron, steel or other metals in the forms of sheet, rod, wire and the like prior to fabrication into the ultimate article of commerce. Most commonly a dilute sulfuric acid solution is used for this purpose. However, other acids are also commonly employed such as hydrochloric acid, phosphoric, nitric, citric, mixture of acids which may include hydrofluoric acid and the like. Since the beginning of the modern steel industry, the removal of oxide scale formed on the metal prior to the rolling, working or other fabrication of the metal has been accomplished by treatment of the metal surface with dilute solutions of various acids. Although other mineral acids such as phosphoric and hydrochloric acids have also been used; the most common process utilizes sulfuric acid. The reaction of sulfuric acid with the metal oxide in the cleaning operation results in the formation of a weak sulfuric acid solution of ferrous sulfate and is commonly known as waste pickle liquor. In the case of pickle liquors containing hydrochloric acid (also known as muriatic acid), ferrous chloride is present in the waste pickle liquor. In other pickling systems, the reaction of the iron with the acid will form the corresponding salt which will be present in the waste pickle liquor.

Enormous amounts of pickle liquor are generated in the large steel and iron mils in the United States as well as in other countries. It has been common practice in the past to dispose of waste pickle liquor by simply dumping it into rivers, lakes and other bodies of water. However, it is now widely acknowledged that these careless procedures caused severe pollution problems and as a result came under the close scrutiny of local, state and federal governmental agencies. Where naturally occurring bodies of water are not available or where the dumping of waste liquor into natural bodies of water is prohibited, it was, and continues to be, common practice to form large lagoons or ponds adjacent the steel mils where the waste pickle liquor is dumped and permitted to settle into the ground. However, with increasing costs for real estate, the use of hundreds of acres of usable land for disposal of waste products is a luxury which is becoming increasingly difficult to justify. Moreover, such procedures also raise serious questions concerning contamination of sub-surface waters.

Governmental authorities on the local, state, and federal levels have imposed stricter controls and laws which are designed to prevent the pollution of rivers and lakes and have placed a burden on the steel industry to develop other methods of disposing of these waste materials. A variety of proposals have been made of methods for disposing of the waste pickle liquor; however, few of such methods have been entirely satisfactory.

It is therefore an object of the present invention to provide a method for eliminating the dumping of waste pickle liquor and the resulting pollution of bodies of water and, instead, to convert the waste material into commercially useful products.

It is a further object of the present invention to provide a method whereby the steel and iron industry can dispose of the waste materials in pickle liquor and at the same time readily convert the used up pickle liquod into useful products which meet with the approval of governmental authorities.

It is a further object of the present invention to provide methods for disposing of waste pickle liquor which avoid pollution and hazards to health and life in the vicinity of the steel mills.

In attaining the above objects, one feature of the invention resides in treating the waste pickle liquor to remove suspended solids therefrom and subsequently contacting the filtered solution with NaOCl to precipitate the iron content thereof followed by drying and recovery of ferric oxide as a product.

A further feature resides in contacting waste pickle liquor derived from sulfuric acid, hydrochloric acid or other mineral acid pickling operations with NaOCl and subsequently recovering useful by-products therefrom.

A still further feature of the present invention resides in saturating the filtered waste pickle liquor solution with NaOCl and subsequently recovering a sodium salt.

The above objects, features and advantages will become apparent to those skilled in the art from the following detailed description of the invention taken in conjunction with the drawing which depicts a schematic flow diagram of the process of this invention.

Briefly described, the process of this invention resides in treating waste pickle liquor by subjecting it to cooling or chilling sufficient to crystallize out the iron salts. Acid is recovered therefrom by simple filtration and may be directly returned to the pickling operation. The remaining crystals which contain the iron salts are then dissolved in water ready for the next operation. Filtration may be carried out at this point to remove colorants, impurities and the like. Contact with NaOCl (sodium hypochlorite, e.g., "Chlorox") may be conveniently carried out in a separate reaction vessel leading to ultimate recovery of ferrous oxide. The solids, for example, in the form of a slurry, may be filtered and the residue evaporated to obtain iron oxide. Valuable products can be obtained from the filtrate of the last named step by evaporating to recover the sodium salt which is sodium sulfate (Glauber's salt) in the case where the pickle liquor contains sulfuric acid; or sodium chloride in the case were the pickle liquor contains hydrochloric acid.

In carrying out the details of the present invention waste pickle liquor 1 direct from the steel mill or from storage is conveyed to a chilling or cooling tank 2. This tank is equipped with suitable means for refrigerating or cooling and is, conventionally of double wall construction and acid resistant. It can be jacketed to reduce heat transfer to the exterior. The temperature of the system is brought down to a suitable level to crystallize the iron salts out of solution. Illustratively, the crystals comprise iron sulfate in the case of sulfuric acid waste pickle liquor. It will be manifest that the optimum temperature for the chilling operation to obtain the desired iron salt crystals will depend upon the particular composition of the waste pickle liquor. Separation of the solids from the liquid enables the recovery of acid for recycle. Employing this method it is possible to recover 80% of the spent acid in its original strength, i.e. 15% acidity for recycle 4 back to the pickling operation essentially without further treatment.

Any impurities, inhibitors, etc. that were present in the waste pickle liquor are mostly trapped in the iron salt crystals. Thereafter water, either hot, cold, or at room temperature, is introduced 3 into vessel 2 to dissolve the crytals. Depending upon the temperature, the quantity of water can vary widely. If hot water is available as little as ½ by weight of the crystals can be used to rapidly dissolve the crystals. It is desirable to filter the solution at this point to remove the colorants, impurities, etc. This can conveniently be carried out by locating a filter within the bottom of the vessel 2 or in the line 5 leading to the next vessel 6. Any suitable filtration material, for example, activated charcoal, glass fibers, etc. may be used. Mixtures of activated charcoal and diatomaceous earth may also be used for this purpose. By activated charcoal is meant charcoal which is capable of functioning as a filtering agent. These and other commercially available filtering aids can be used. It should also be understood that any suitable filtration equipment may be used for this purpose. Of course, the equipment should be acid resistant. Many different filtering systems are currently available and no particular criticality is attached thereto. After the filtration has been completed, the suspended solids and other contaminants may be discarded or conveyed to other purification systems for recovery thereof.

The filtrate which is obtained after the filtration step in vessel 2 is conveyed in line 5 to reaction vessel 6 for contacting with NaOCl.

Sodium hypochlorite, NaOCl, is commonly available in aqueous solutions in concentrations of 4 to 6%. For example, the commonly available solution contains 0.045–0.50 gram of sodium hypochlorite per 100 cc. of solution, which is equivalent to 0.43 to 0.48 gram of available chlorine. Any equipment suitable for effecting liquid-liquid contact may be used for this purpose. Generally, the equipment must be gas tight and be resistant to chlorine. Openings in the top of the reactor are provided for the addition of NaOCl 7, exhaust of chlorine gas 8, and for agitation means. In the reaction which takes place in the chlorination apparatus, the iron is converted to the ferric state and a sodium salt is formed. The particular sodium salt will depend upon the acid used for pickling. Saturation of the ferric salt solution with NaOCl results in evolution of chlorine gas which can be vented or recovered. The amount of NaOCl solution employed is not critical. Sufficient amount should be used to precipitate the iron content of the solution. Beyond that, additional NaOCl would have little effect and would merely add unnecessarily to the cost of the waste treatment. Filtration yields a paste-like mass or sludge which is believed to be ferric hydroxide. The latter, in the form of a slurry may be removed through a suitable conduit 13 whereupon it may be conveyed to an oven (not shown), for example, for drying and recovery as ferric oxide, $Fe_2O_3$. Alternatively, a drying mechanism may be built directly into the reaction vessel 6. Optionally, the ferric oxide may be subsequently ground to produce a final product of any of the desired size.

The filtrate from vessel 6 contains the salt, illustratively sodium sulfate which is formed in the chlorination means and may be conveyed, in a liquid form or slurry, through a suitable conduit to a conventional filtration system for recovery of sodium sulfate. Alternatively, the sodium sulfate solution or slurry may be conveyed 10 to an evaporator 11 for drying to recover a dry salt 12 which has many uses in commerce. This salt, $Na_2SO_4$, which is commonly known as Glauber's salt, has many therapeutic properties and is used in medicine as a cathartic and diuretic. It is also used in the dyeing and printing of textiles, standardizing dyes, in freezing mixtures, in the manufacture of glass, in the manufacture of ultra-marine pigments and in the paper pulp industry. Conventional evaporator means may be used for this purpose. Illustratively, the evaporator is a jacketed vessel which may be heated by steam or electricity. It is of double wall construction or may be a coil within a double wall.

The chlorine gas 8 formed during the reaction is sent over to a chlorine recovery tank 9 for eventual recycle to vessel 6. Tank 9 contains a solution of NaOH which reacts with chlorine gas to form NaOCl.

In summary, the final products produced in accordance with the process described in detail above are ferric oxide ($Fe_2O_3$), a sodium salt (sodium sulfate) and chlorine gas which in turn is converted to sodium hypochlorite (NaOCl). Thus, there is no need to dump any pollutants into lakes, streams or rivers. Nor is there any need to bury any large amounts of materials. All of the products obtained from the process are valuable materials and can be utilized for a variety of purposes.

While the foregoing description of the invention has been related with respect to waste pickle liquor derived from a sulfuric acid pickling operation, it should be noted that the invention also pertains to waste pickle liquor obtained from hydrochloric or other acid treatment processes or processes employing mixtures of acids.

When the waste pickle liquor contains predominantly hydrochloric acid, the process of the invention is carried out in the same manner with NaOCl. However, the resulting products will be different. Thus, in the first stage 2 the hydrochloric acid is recovered in sufficient strength to be directly returned 4 to the pickling operation. The crystals obtained in the crystallization step 2 are iron chloride which are conveyed 5 to the oxidation stage 6 where NaOCl is introduced 7 and reacted with the iron chloride to yield iron oxide in the form of a reddish paste 13. The filtrate contains sodium chloride and is conveyed 10 to the evaporator 11 for recovery as sodium chloride 12. The chlorine gas liberated in reactor 6 is conveyed 8 to the recovery unit 9 for treatment with NaOH and eventual recycle to reactor 6.

When employing other pickling acids, the corresponding iron salt will be recovered in the crystallization vessel 2 and the corresponding sodium salt will eventually be recovered in evaporator 11. In all cases the oxidation is conducted with NaOCl and the essential steps in the process are identical.

In carrying out the process described herein, the waste pickle liquor may be at any suitable temperature. Most conveniently, it is treated under ambient conditions. Generally, the waste liquor is taken directly from the pickling operation; no settling or other pretreatment is necessary. Likewise, the addition of the NaOCl takes place under ambient conditions. The NaOCl is normally used in the form of an aqueous solution thereof. Any suitable filtering equipment may be used to perform the filtration of the ferric oxide that is produced in the process. The usual evaporation, filtration and drying means can be employed in carrying out of applicant's invention.

The following example is intended to illustrate the more particular aspects of the claimed invention:

Waste sulfuric acid pickle liquor at ambient temperature containing suspended solids and various contaminants such as other metal sulfates, metal sulfides, lubricants, inhibitors, hydrocarbons and other organics and the like is conveyed to a double wall crystallization tank equipped with refrigeration means and agitation means. The temperature is then reduced sufficiently, e.g. 0° C. (32° F.), to crystallize out the iron sulfate with most of the impurities, suspended solids and contaminants. Following a period of standing to bring about maximum precipitation of $FeSO_4$, the contents of the vessel are then filtered and the filtrate which consists essentially of a solution of about 15% sulfuric acid is returned to the pickling operation. Any suitable filtering medium can be employed for this purpose. After the filtrate is removed, the residue is dissolved in hot water and pumped or otherwise conveyed to a gas tight reaction vessel for the oxidation reaction. Thereafter, the liquor which may be at ambient conditions is saturated with NaOCl to precipitate the iron in the form of a paste-like mass. Sufficient NaOCl was added until no additional precipitation of iron occurred. Thus, for example, a volume ratio of 2:1 NaOCl to spent acid has been found satisfactory employing 5% NaOCl. Agitation is usually employed to insure sufficient reaction. The dissolved ferrous iron is oxidized to the ferric state and separates practically quantitatively from the solution in the form of $Fe(OH)_3$.

Chlorine gas liberated by the reaction may be collected in cylinders or the vapors may be saturated with sodium hydroxide to form NaOCl for recycling to be used in the process. The solids are then filtered employing any suitable filter such as charcoal and thereafter, ferric hydroxide solids in the form of a paste-like mass or slurry are conveyed to an oven or evaporator means where the water is evaporated to dryness. Heating at 200° C. to 700° C. will transform the hydroxide into the product, $Fe_2O_3$, ferric oxide. The dry ferric oxide is conveyed to a suitable grinding means such as a ball mill where it is ground to the desired granular size and is then packaged for suitable use.

The filtrate from the oxidation step is a solution of sodium sulfate which is then conveyed to an evaporator to evaporate the water and obtain the crystals of dry sodium sulfate, i.e., Glauber's salt, which may then be used for its intended purpose. Alternatively, the solution can be spray dried or dried in any other suitable fashion.

It is understood that various other modifications will be apparent to and can readily be made by those skilled in the art without departing from the scope and spirit of this invention.

What is claimed is:

1. A method for treating iron-containing waste pickle liquor and the conversion thereof into useful chemical compounds which comprises:
   cooling the waste pickle liquor to a temperature sufficiently low to crystallize and precipitate the iron salts present in the waste pickle liquor,
   separating the precipitated iron salt crystals from the supernatent liquid,
   dissolving the precipitated iron salts in water,
   contacting the solution of iron salts with sufficient NaOCl to precipitate iron hydroxide and thereafter filtering the solution to recover the iron hydroxide precipitate.

2. A method as set forth in claim 1 wherein supernatent liquid comprises pickling acid which is recycled to storage.

3. A method as set forth in claim 1 wherein the waste pickle liquor comprises ferrous sulfate and sulfuric acid.

4. A method as set forth in claim 1 wherein the waste pickle liquor comprises ferrous chloride and hydrochloric acid.

5. A method as set forth in claim 1 comprising the step of cooling the waste pickle liquor to a temperature of about 0° C. to precipitate the iron salts contained in the dissolved state in said waste pickle liquor, filtering the waste pickle liquor to recover the solid iron salt crystals, dissolving the iron salt crystals in water and contacting the iron salts with a solution of NaOCl in sufficient amount to precipitate substantially all of the iron in the form of iron hydroxide and thereafter heating the iron hydroxide to convert it to ferric oxide.

6. A method as set forth in claim 5 wherein the filtrate from the cooling steps contains pickling acid which is returned for use in the pickling process.

7. A method as set forth in claim 1 wherein the filtrate after saturation with NaOCl is recovered and subsequently evaporated to dryness to obtain the sodium salt corresponding to the acid used in the pickling process.

8. A method as set forth in claim 1 wherein chlorine gas is evolved during the reaction of the iron salts with the NaOCl and the chlorine gas is contacted with NaOH to produce NaOCl which is then recycled for contacting with the iron salts.

9. A method as set forth in claim 1 wherein an aqueous solution of from 4% to 6% NaOCl is employed.

10. A method as set forth in claim 1 carried out in a continuous manner.

11. A method as set forth in claim 1, wherein the precipitated iron hydroxide residue is evaporated to obtain iron oxide.

References Cited

UNITED STATES PATENTS

| | | | |
|---|---|---|---|
| 2,773,743 | 12/1956 | Fackert | 23—200 |
| 2,289,258 | 7/1942 | French | 23—200 |
| 2,384,579 | 9/1945 | Vesce | 106—304 X |
| 2,416,508 | 2/1947 | Barnes et al. | 23—200 X |
| 1,450,216 | 4/1923 | Marsh et al. | 23—126 X |
| 1,726,851 | 9/1929 | McLeod | 106—304 |
| 3,262,755 | 7/1966 | Steinmetz et al. | 23—200 |

OTHER REFERENCES

Partington, J. R., A Textbook of Inorganic Chemistry; 6th ed.; MacMillan & Co. Ltd.; London 1950; pp. 262-3.

OSCAR R. VERTIZ, Primary Examiner

G. O. PETERS, Assistant Examiner

U.S. Cl. X.R.

134—13